United States Patent
Yamaguchi et al.

(10) Patent No.: US 9,346,928 B2
(45) Date of Patent: May 24, 2016

(54) PACKING SHEET

(75) Inventors: Keita Yamaguchi, Tokyo (JP); Satoshi Nakano, Tokyo (JP)

(73) Assignee: SUMITOMO BAKELITE CO., LTD., Shinagawa-ku, Tokyo (JP)

(*) Notice: Subject to any disclaimer, the term of this patent is extended or adjusted under 35 U.S.C. 154(b) by 0 days.

(21) Appl. No.: 14/344,106

(22) PCT Filed: Apr. 25, 2012

(86) PCT No.: PCT/JP2012/061067
§ 371 (c)(1),
(2), (4) Date: Mar. 11, 2014

(87) PCT Pub. No.: WO2013/038746
PCT Pub. Date: Mar. 21, 2013

(65) Prior Publication Data
US 2014/0221572 A1 Aug. 7, 2014

(30) Foreign Application Priority Data

Sep. 13, 2011 (JP) ................................. 2011-199024

(51) Int. Cl.
*C08J 5/18* (2006.01)
*C08L 23/06* (2006.01)
*B65D 75/32* (2006.01)
*C08L 23/02* (2006.01)

(52) U.S. Cl.
CPC .............. *C08J 5/18* (2013.01); *B65D 75/326* (2013.01); *C08L 23/06* (2013.01); *C08J 2323/06* (2013.01); *C08J 2345/00* (2013.01); *C08J 2423/06* (2013.01); *C08J 2445/00* (2013.01); *C08L 23/02* (2013.01); *C08L 2201/14* (2013.01); *C08L 2205/03* (2013.01); *C08L 2555/74* (2013.01)

(58) Field of Classification Search
CPC ..... C08L 23/06; C08L 23/0823; C08L 95/00; C08L 101/00; C08J 23/0823
USPC ............ 525/191, 211, 240; 524/77, 502, 503, 524/570
See application file for complete search history.

(56) References Cited

U.S. PATENT DOCUMENTS

| 4,789,699 | A | * | 12/1988 | Kieffer et al. | .................. 524/271 |
| 5,405,682 | A | * | 4/1995 | Shawyer et al. | .............. 428/221 |
| 6,319,969 | B1 | * | 11/2001 | Walther et al. | ................ 524/300 |
| 2003/0055175 | A1 | | 3/2003 | Klosiewicz | |
| 2007/0009753 | A1 | | 1/2007 | Sato et al. | |

FOREIGN PATENT DOCUMENTS

| JP | 59-143613 | 8/1984 |
| JP | 06-084063 | 10/1994 |
| JP | 07-186345 | 7/1995 |
| JP | 2005-041890 | 2/2005 |
| JP | 2005-246612 | 9/2005 |
| JP | 2007-021755 | 2/2007 |
| JP | 2009-102651 | 5/2009 |
| JP | 2009-227917 | 10/2009 |

OTHER PUBLICATIONS http://ws.eastman.com/ProductCatalogApps/PageControllers/Prod-Datasheet_PC.aspx?Product=71049324 &sCategoryName=Generic downloaded from the World Wide Web Mar. 28, 2015.*
http://ws.eastman.com/ProductCatalogApps/PageControllers/Prod-Datasheet_PC.aspx?Product=71049328 &sCategoryName=Generic.*
http://ws.eastman.com/ProductCatalogApps/PageControllers/Prod-Datasheet_PC.aspx?Product=71049330 &sCategoryName=Generic.*
International Search Report for International Application No. PCT/JP2012/061067 mailed on Jun. 5, 2012.
Written Opinion for International Application No. PCT/JP2012/061067 mailed on Jun. 5, 2012.

* cited by examiner

*Primary Examiner* — Nathan M Nutter
(74) *Attorney, Agent, or Firm* — Amin, Turocy & Watson LLP; Gregory Turocy

(57) ABSTRACT

The present invention provides a packing sheet and PTP packing body, which do not include halogen materials such as chlorine and fluorine and have high water vapor barrier property. The packing sheet of the present invention includes at least a high-density polyethylene resin (A), petroleum resin (B), and amorphous polyolefin resin (C). Also, it is preferable that the weight blending ratio ((A+B)/C) of the total weight of the high-density polyethylene (A) and the petroleum resin (B) to the weight of the amorphous polyolefin (C) be 50/50 or more and 90/10 or less.

12 Claims, 3 Drawing Sheets

PACKING SHEET

TECHNICAL FIELD

The present invention relates to a packing sheet for foods, pharmaceutical products and the like. The present application claims priority on the basis of Japanese Patent Application No. 2011-199024, filed in Japan on Sep. 13, 2011, the contents of which are incorporated herein by reference.

BACKGROUND ART

Conventionally, for packing of foods, pharmaceutical products, and the like, a so-called press-through pack (hereinafter PTP) packing body, in which a content is stored in a pocket produced by forming a plastic sheet and is packed by heat-sealing with an aluminum foil, to which an adhesive is applied, as a lid material, has been used. As the plastic sheet, polyvinyl chloride resin has been mainly used in terms of transparency, moldability, stiffness, and cost. However, when the content is hygroscopic, since the moisture-proof property in the polyvinyl chloride resin is poor, it has been treated by coating polyvinylidene chloride resin having excellent moisture-proof property to a polyvinyl chloride resin sheet. However, because these plastic sheets are expensive, there is a problem in terms of cost.

In recent years, in light of environmental concerns, the use of a polyvinyl chloride resin and polyvinylidene chloride resin is avoided because chlorine-including gas is generated when they are burned up. On the other hand, with the improvements in molding machines recently, a polypropylene sheet, which was conventionally hard to mold, has been focused on in terms of a moisture-proof property, low cost, and ease of treatment and has been used in several applications including PTP packing. In recent years, in order to store medications which are sensitive to moisture or in order to advance the development speed of new medications, a sheet which has a water vapor barrier property with excellent reliability has been required and a method of improving the water vapor barrier property by adding petroleum resin to polypropylene resin has been conducted. However, in the method of adding petroleum resin to polypropylene resin, although the transparency and moldability of the molded sheet are good, the water vapor barrier property is insufficient compared with a laminated sheet, in which a polyvinyl chloride resin sheet is coated with the polyvinylidene chloride resin. On the other hand, when a high-density polyethylene resin having a higher barrier property among polyolefin resins is used, although the water vapor barrier property is improved, it is required to improve a barrier property lowered due to dimensional variation after molding the sheet and transparency.

CITATION LIST

Patent Literature

[Patent Document 1] Japanese Unexamined Patent Application, First Publication No. Sho59-143613
[Patent Document 2] Japanese Examined Patent Application Publication No. H6-084063

SUMMARY OF INVENTION

Problem to be Solved by the Invention

The present invention provides a packing sheet which does not include a halogen material such as chlorine and fluorine and has a high water vapor barrier property, and a PTP packing container which has a high barrier property after molding.

Means for Solving the Problem

[1] A packing sheet of the present invention includes at least a high-density polyethylene resin (A), petroleum resin (B), and amorphous polyolefin resin (C).
[2] In a packing sheet of the present invention, the weight blending ratio ((A+B)/C) of the total weight of the high-density polyethylene (A) and the petroleum resin (B) to the weight of the amorphous polyolefin (C) can be 50/50 or more and 90/10 or less.
[3] In a packing sheet of the present invention, the weight blending ratio (A/B) of the high-density polyethylene resin (A) to the petroleum resin (B) can be 70/30 or more and 90/10 or less.
[4] In a packing sheet of the present invention, the amorphous polyolefin resin (C) can include a cyclic polyolefin.
[5] In a packing sheet of the present invention, the cyclic polyolefin can include a copolymer of cyclic olefin and olefin.
[6] In a packing sheet of the present invention, the copolymer can include a copolymer of one or more cyclic olefins selected from the group consisting of norbornene, a norbornene derivative, a product of the addition reaction of dicyclopentadiene and ethylene, and a product of the addition reaction of dicyclopentadiene derivative and ethylene, and olefin.
[7] In a packing sheet of the present invention, the olefin can include one or more olefins selected from the group consisting of ethylene, propylene, and butadiene.
[8] The amorphous polyolefin resin (C) can include a copolymer of norbornene and ethylene.
[9] In a packing sheet of the present invention, the amorphous polyolefin resin (C) can be a copolymer of a product of the addition reaction of cyclopentadiene or a derivative thereof and norbornene or a derivative thereof and one or more unsaturated monomers selected from the group consisting of an ethylene, butadiene, and styrene derivative, or a hydrogenated product thereof.
[10] In a packing sheet of the present invention, the amorphous polyolefin resin (C) can be a copolymer of a product of the addition reaction of dicyclopentadiene or a derivative thereof and ethylene and one or more unsaturated monomers selected from the group consisting of an ethylene, butadiene, and styrene derivative, or a hydrogenated product thereof.
[11] In a packing sheet of the present invention, the petroleum resin (B) can be a hydrogenated dicyclopentadiene petroleum resin.
[12] In a packing sheet of the present invention, the number average molecular weight of the petroleum resin (B) can be 300 to 2000.
[13] A press-through pack packing body of the present invention can be produced using the packing sheet described in any of [1] to [12].

Effects of the Invention

A packing sheet of the present invention does not include halogen materials such as chlorine and fluorine and has a high water vapor barrier property and moldability for a PTP packing body. Also, a PTP packing body has excellent moisture-proof property.

DESCRIPTION OF EMBODIMENTS

Figure 1:
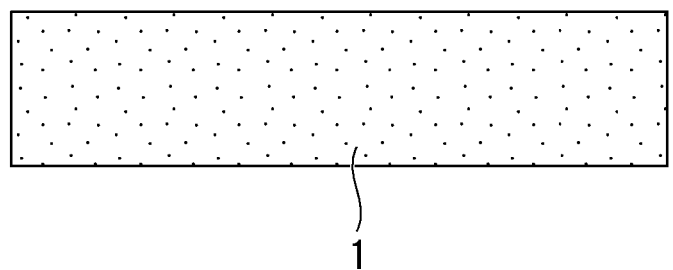
FIG. 1 is a schematic sectional view showing an example of a packing sheet in the present invention.

The present invention will be explained using the figures.

A packing sheet of the present invention is a sheet having at least one layer and includes at least high-density polyethylene resin (A), petroleum resin (B), and amorphous polyolefin resin (C).

In the packing sheet of the present invention, the weight blending ratio ((A+B)/C) of the total weight of the high-density polyethylene resin (A) and the petroleum resin (B) to the weight of the amorphous polyolefin (C) is preferably 50/50 or more and 90/10 or less and more preferably 50/50 or more and 70/30 or less. By making the weight blending ratio be in the range, because the dimensional variation of a container after molding can be suppressed, the resin composition becomes one providing a container having a high barrier property after molding. When it is lower than the lower limit of the range, there is a cost disadvantage and when it is greater than the upper limit, because dimensional variation after molding is generated, there is a possibility that the barrier property after molding degrades.

In the packing sheet of the present invention, the weight blending ratio (A/B) of the high-density polyethylene resin (A) to the petroleum resin (B) is preferably 70/30 or more and 90/10 or less. When making the weight blending ratio in the resin layer be equal to or greater than the lower limit, the stiffness property of the sheet is maintained and the extracted volume of the residual monomer or the low-molecular-weight compound, when a solvent is n-heptane, can be suppressed within 150 ppm to meet the Ministry of Welfare ministerial notification No. 20. Also, by being equal to or lower than the lower limit, the moldability of the sheet is improved, and a high level water vapor barrier property can be provided.

The density of the high-density polyethylene resin (A) used in the present invention is preferably 0.945 to 0.970 g/cm$^3$. By making the density be within the range, a high barrier property or transparency can be obtained.

Also, in the high-density polyethylene resin (A), the melt flow rate (hereinafter referred to as MFR) is preferably 0.2 to 8 g/10 min. By making MFR be within the range, the transparency and stiffness property are not impaired, the melt extrusion property is excellent, and an occurrence of "gum" on a die extrusion surface can be suppressed.

A method of producing a high-density polyethylene resin (A) is not limited, and a generally known polymerization method using a common catalyst can be used. For example, it can be obtained by polymerizing ethylene in the presence or absence of α-olefin having 3 to 18 carbon atoms while using a compound containing a transition metal as catalyst and the polymerization reaction is conducted under a polymerization temperature of 30 to 300° C. and a polymerization pressure of normal pressure to 3000 kg/cm$^3$. This polymerization method includes a solvent solution polymerization, slurry polymerization, high-pressure ion polymerization, gas phase polymerization method, and the like.

Although, as petroleum resin (B) used in the present invention, aliphatic or aromatic hydrocarbon resin, alicyclic saturated hydrocarbon resin, copolymer resin, and the like can be used, and in view of odor and transparency, alicyclic hydrocarbon resin is preferable and hydrogenated dicyclopentadiene petroleum resin, which can be obtained by conducting a hydrogenation reaction after thermal polymerization of dicyclopentadiene, is more preferable. The hydrogenation rate of hydrogenated dicyclopentadiene petroleum resin is preferably 70% or more and more preferably 90% or more. By increasing the hydrogenation rate, a polar character of the petroleum resin is reduced to improve the compatibility with the base resin.

Also, the softening point (according to a ring and ball method, based on JIS K2548) is set at preferably about 70 to 150° C. and more preferably 90 to 140° C. By setting the softening point at 70° C. or more, the balance of heat resistance and adhesive performance of the composition to the polyolefin becomes good. By setting the softening point at 150° C. or less, the production of the resin becomes easy and it is advantageous to the production cost, thereby being preferable.

The number average molecular weight of the petroleum resin (B) is set at preferably 300 to 2000 and more preferably 500 to 1500. By setting the number average molecular weight at equal to or greater than the lower limit, the adhesive performance of the resin composition such as the cohesive strength becomes good and the water vapor barrier property is improved. By setting the number average molecular weight at equal to or lower than the upper limit, the compatibility with a rubber polymer or the synthetic resin polymer of the base polymer becomes good and the production of the resin becomes easy and it is advantageous to the production cost, thereby being preferable. The number average molecular weight is based on the gel permeation chromatography (GPC) method, in the terms of polystyrene.

Although, as the amorphous polyolefin resin (C) used in the present invention, a cyclic olefin polymer obtained from a ring-opening metathesis polymer of cyclic olefin monomer and hydrogenated product thereof, and a cyclic olefin copolymer obtained from copolymers of cyclic olefin monomer and α-olefins can be used, and in view of the moldability for a packing container, a cyclic olefin copolymer is more preferable.

Also, in the present invention, the amorphous polyolefin (C) can include a cyclic polyolefin. The cyclic polyolefin can include a copolymer of a cyclic olefin and olefin. The copolymer can include a copolymer of one or more cyclic olefins selected from the group consisting of a norbornene, norbornene derivative, a product of the addition reaction of dicyclopentadiene and ethylene, and a product of the addition reaction of dicyclopentadiene derivative and ethylene, and olefin.

The olefin can include one or more olefins selected from the group consisting of an ethylene, propylene, and butadiene.

As a cyclic olefin monomer and olefin monomer providing the polymer, respectively, a norbornene and ethylene are preferable. Also, various physical properties of the cyclic olefin copolymer are changed due to the ratio of the cyclic olefin monomer forming the polymer. Although the ratio of the cyclic olefin monomer of 50 wt % or more and 80 wt % or less can be used, the ratio of 60 wt % or more and 70 wt % or less is more preferable. When making the ratio of the cyclic olefin monomer be within the above range, the softening temperature is balanced against that of the high-density polyethylene of the resin composition to suppress a dimensional variation of the container after molding.

Also, the amorphous polyolefin resin (C) can be a copolymer of a product of the addition reaction of cyclopentadiene or a derivative thereof and norbornene or a derivative thereof and one or more unsaturated monomers selected from the group consisting of an ethylene, butadiene, and styrene derivative, or a hydrogenated product thereof.

In addition, the amorphous polyolefin resin (C) can be a copolymer of a product of the addition reaction of dicyclopentadiene or a derivative thereof and an ethylene and one or more unsaturated monomers selected from the group consisting of an ethylene, butadiene, and styrene derivative, or a hydrogenated product thereof.

Moreover, as the cyclic olefin copolymer, the glass-transition temperature is set at preferably 140° C. or less and more preferably 100° C. or less. By making the glass-transition temperature be equal to or lower than the above temperature, it can be equal to or lower than the softening temperature of the high-density polyethylene in the resin composition and suppress a dimensional variation of the container after molding, and the resin composition becomes one providing a container of high barrier property after molding.

The cyclic olefin copolymer has MFR of preferably 0.2 to 12 g/10 min. By making the MFR be within the above range, the melt extrusion property is excellent, and by adjusting the melt viscosity, the compatibility with the high-density polyethylene resin (A) becomes good.

(Production Method of Sheet)

Production methods of a packing sheet in the present invention include a generally known method of producing a film, in which materials are blended preliminarily, and melted and kneaded by an extruder, and then a sheet-like film is produced using a T-type die. Methods of blending materials are not limited and include a generally known method of blending. The generally known methods of blending include, for example, a method of dry-blending a high-density polyethylene resin (A), petroleum resin (B), and amorphous polyolefin resin (C), and a method of melt-blending them. In the dry-blending method, various blenders, such as a Henschel mixer and tumbler mixer can be used and in the melt-blending method, various mixers such as a single screw extruder, twin screw extruder, Banbury mixer, and heat roll, can be used.

In the packing sheet of the present invention, within a range which does not impair the objects and effects of the present invention, as necessary, additives such as antioxidants, lubricants, antistatic agents, processability-improving agents, and anti-blocking agents can be added. The antioxidants, for example, include a phenolic stabilizer such as 2,6-di-t-butyl-p-cresol (BHT), tetra kis[methylene-3-(3,5-di-t-butyl-4-hydroxyphenyl)propionate]methane (manufactured by Ciba Specialty Chemicals, trade name: IRGANOX1010), and n-octadecyl-3-(4'-hydroxy-3,5'-di-t-butylphenyl)propionate (manufactured by Ciba Specialty Chemicals, trade name: IRGANOX1076) and a phosphite stabilizer such as bis(2,4-di-t-butylphenyl)pentaerythritol diphosphate and tris(2,4-di-t-butylphenyl)phosphite.

The lubricant includes, for example, erucic acid amide, higher fatty acid amides, and higher fatty acid esters, and the antistatic agent includes, for example, glycerin esters of fatty acids having 8 to 22 carbon atoms, sorbitan esters, and polyethylene glycol esters, the processability-improving agents, for example, include fatty acid metal salts such as calcium stearate, and the anti-blocking agent, for example, includes silica, diatomaceous earth, calcium carbonate, and talc.

The above various additives may be added to the resin mixture obtained by preliminarily blending the high-density polyethylene resin(A), the petroleum resin (B), and the amorphous polyolefin resin (C), may be added to each of the high-density polyethylene resin(A), the petroleum resin (B), and the amorphous polyolefin resin (C), and may be used as a masterbatch.

(How to Use Packing Sheet of the Present Invention)

Figure 2:
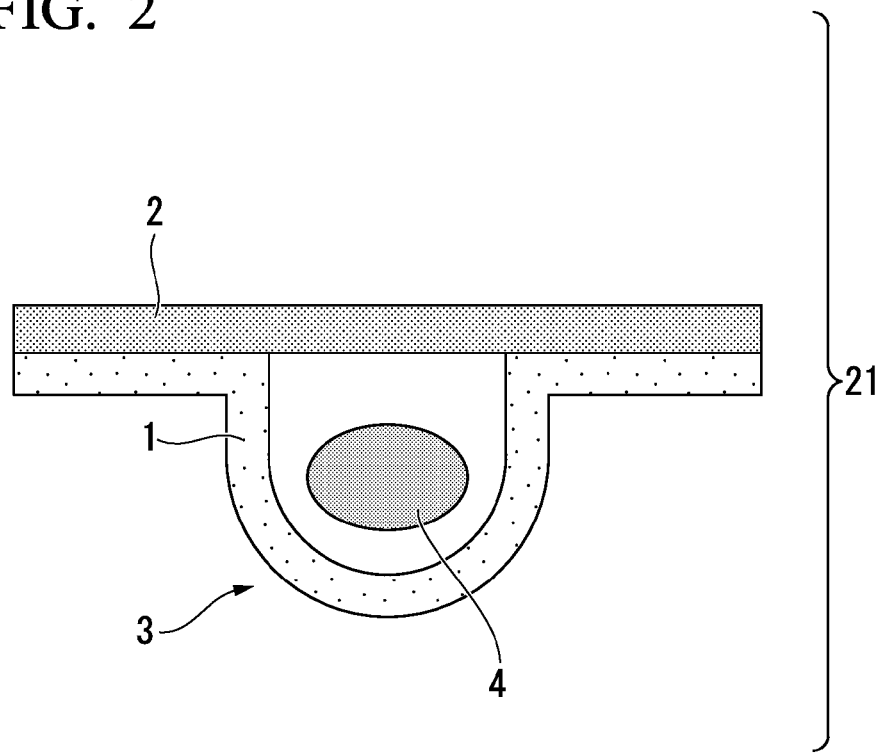
FIG. 2 is a schematic sectional view showing an example of a PTP packing body in the present invention.

Examples of use of the packing sheet of the present invention include a bottom substance of a PTP packing body. For example, in the field of medical packing, a PTP packing body is indicated to be a packing body for packing of a solid agent such as a pill and encapsulated formulation, as shown in FIG. 2, in which the packing sheet of the present invention is molded to form a pocket configuration to be a bottom substance 3 and the bottom substance 3 is filled with a solid medication 4 and is sealed with a cover substance 2 consisting of aluminum foil. When a medication is impaired by moisture, the packing sheet is required to have a high level of the water vapor barrier property. Because the water vapor barrier property is good, the packing sheet of the present invention can be used as the bottom substance 3 of a PTP packing body.

EXAMPLES

Although the content of the present invention will be explained below using examples, the present invention is not limited to these examples.

Example 1

A high-density polyethylene resin of 56 parts by weight, a petroleum resin of 14 parts by weight, and an amorphous resin of 30 parts by weight were dry-blended, were melted and kneaded using the second screw extruder, and were sheeted by a T die casting method to obtain a packing sheet with a thickness of 0.3 mm.

Each material using examples and comparative examples is as follows.

High-density polyethylene resin: Asahi Kasei Corporation SUNTEC HD-B161 density 0.966 g/cm$^3$ Petroleum resin: Arakawa Chemical Industries, Ltd. hydrogenated dicyclopentadiene petroleum resin ARKON P-125

Amorphous resin: POLYPLASTICS CO., LTD. cyclic olefin copolymer TOPAS8007F-04

Example 2

A packing sheet was obtained in the same manner as Example 1, except that a high-density polyethylene resin of 72 parts by weight, a petroleum resin of 18 parts by weight, and an amorphous resin of 10 parts by weight were used.

Example 3

A packing sheet was obtained in the same manner as Example 1, except that a high-density polyethylene resin of 40 parts by weight, a petroleum resin of 10 parts by weight, and an amorphous resin of 50 parts by weight were used.

Example 4

A packing sheet was obtained in the same manner as Example 1, except that a high-density polyethylene resin of 49 parts by weight, a petroleum resin of 21 parts by weight, and an amorphous resin of 30 parts by weight were used.

Example 5

A packing sheet was obtained in the same manner as Example 1, except that a high-density polyethylene resin of 63 parts by weight, a petroleum resin of 27 parts by weight, and an amorphous resin of 10 parts by weight were used.

Example 6

A packing sheet was obtained in the same manner as Example 1, except that a high-density polyethylene resin of 35 parts by weight, a petroleum resin of 15 parts by weight, an amorphous resin of 50 parts by weight were used.

Example 7

A packing sheet was obtained in the same manner as Example 1, except that a high-density polyethylene resin of 63 parts by weight, a petroleum resin of 7 parts by weight, and an amorphous resin of 30 parts by weight were used.

Example 8

A packing sheet was obtained in the same manner as Example 1, except that a high-density polyethylene resin of 81 parts by weight, a petroleum resin of 9 parts by weight, and an amorphous resin of 10 parts by weight were used.

Example 9

A packing sheet was obtained in the same manner as Example 1, except that a high-density polyethylene resin of 45 parts by weight, a petroleum resin of 5 parts by weight, and an amorphous resin of 50 parts by weight were used.

Comparative Example 1

A high-density polyethylene resin of 80 parts by weight, and a petroleum resin of 20 parts by weight were dry-blended, were melted and kneaded using the second screw extruder, and were sheeted by T die casting method to obtain a packing sheet with thickness of 0.3 mm.

Comparative Example 2

A high-density polyethylene resin of 70 parts by weight, and an amorphous polyolefin resin of 30 parts by weight were dry-blended, were melted and kneaded using the second screw extruder, and were sheeted by T die casting method to obtain a packing sheet with thickness of 0.3 mm.

(Evaluation of Water Vapor Barrier Property)

The water vapor barrier properties of the obtained packing sheets were measured based on JIS Z 0208 (40° C./90% RH). The results are shown in Table 1.

(Evaluation of Moldability)

Figure 3:
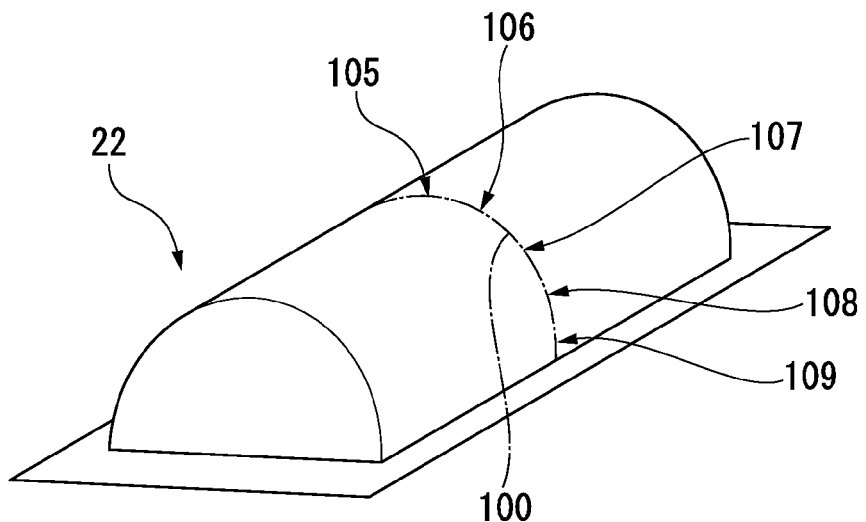
FIG. 3 is a schematic perspective view showing a chemical packing body used for the evaluation of examples in the present invention.
Figure 4:
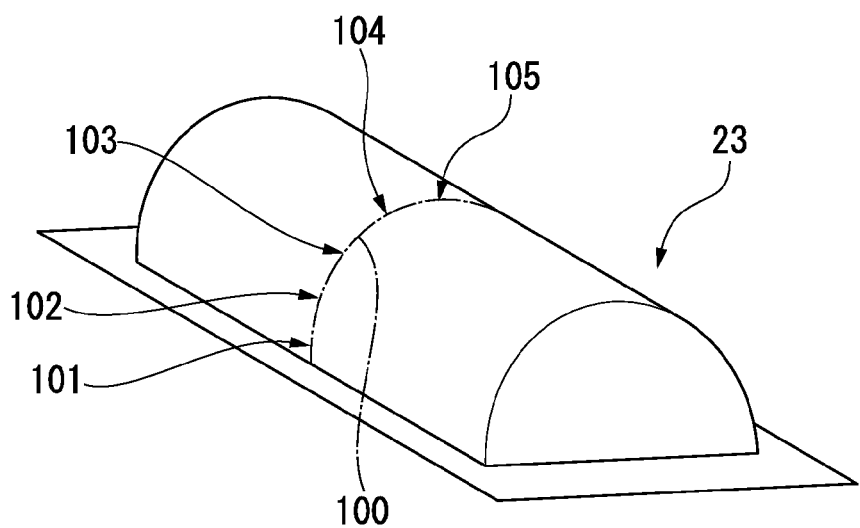
FIG. 4 is a schematic perspective view showing a chemical packing body used for the evaluation of examples in the present invention.
Figure 5:
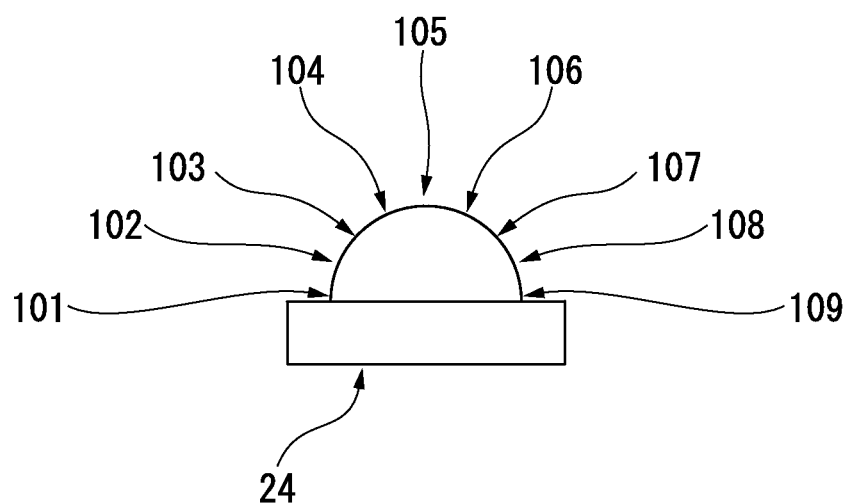
FIG. 5 is a schematic sectional view showing a chemical packing body used for the evaluation of examples in the present invention.

Thicknesses on 9 points (101 to 109) of a girth (on broken line 100) at a center part of samples, the samples being molded by a plug-assist pressure-forming machine (CKD Corporation, FBP-M2) to be second encapsulated form as shown in FIG. 3, were measured using a dial gauge. The results are shown in Table 1.

A: Thinnest thickness among 9 points is 55 μm or more.

B: Thinnest thickness among 9 points is 45 μm or more and lower than 55 μm.

C: Thinnest thickness among 9 points is lower than 45 μm.

(Evaluation of Water Vapor Barrier Property after Molding PTP Packing Body)

The packing sheets obtained in Examples 1 to 9 and Comparative Examples 1 to 2 were molded by a PTP molding machine (CKD Corporation, FBP-M2) to form a concave part, were filled with moisture absorbents (tablet type synthetic zeolites, Tokai Chemical Industries, Ltd.), and were adhered with aluminum foil to produce a PTP packing body. After measuring the weight of the PTP packing bodies, they were put into a constant temperature and humidity chamber at 40° C./90% RH, the change in weight of the PTP package due to moisture absorption of the moisture absorbents was measured over time, and the water vapor barrier property of the packing sheet after molding was measured. The results are shown in Table 1. The thinnest thickness in the molded product evaluated as "A" indicates good result.

(Evaluation of Moldable Temperature Range)

When the obtained packing sheets were molded by a plug-assist pressure-forming machine (CKD Corporation, FBP-M2), the temperature range, in which when molding, the mold-following property is good, it does not adhere to a heating plate, and no cloudy part occurs, was measured. The results are shown in Table 1. Any example has a wide moldable temperature range, compared with comparative example.

(Evaluation of Transparency)

A pylon crystal tape manufactured by KYOWA LIMITED was adhered on both surfaces of the obtained packing sheet to produce samples and the internal haze was measured by a haze meter (NDH2000) manufactured by Nippon Denshoku Industries Co., Ltd. The results are shown in Table 1. Examples 3, 6, and 9 showed a particularly low internal haze.

TABLE 1

|  |  | Example 1 | Example 2 | Example 3 | Example 4 | Example 5 | Example 6 |
|---|---|---|---|---|---|---|---|
| Resin Layer (blending part) | high-density polyethylene | 56 | 72 | 40 | 49 | 63 | 35 |
|  | petroleum resin | 14 | 18 | 10 | 21 | 27 | 15 |
|  | amorphous resin | 30 | 10 | 50 | 30 | 10 | 50 |
| Evaluation Result | property (sheet-state) (g/m³ · day) | 0.33 | 0.35 | 0.32 | 0.33 | 0.35 | 0.32 |
|  | moldability | A | B | A | A | B | A |
|  | property (after molding) (g/m³ · day) | 0.56 | 0.62 | 0.59 | 0.57 | 0.63 | 0.60 |
|  | Moldable temperature range (heating plate temperature) | 118 to 126 | 118 to 124 | 120 to 128 | 118 to 126 | 118 to 124 | 120 to 128 |
|  | Transparency (internal haze) (%) | 40.5 | 55.3 | 28.5 | 39.8 | 54.8 | 28.1 |

TABLE 1-continued

|  |  | Example 7 | Example 8 | Example 9 | Comparative Example 1 | Comparative Example 2 |
|---|---|---|---|---|---|---|
| Resin Layer (blending part) | high-density polyethylene | 63 | 81 | 45 | 80 | 70 |
|  | petroleum resin | 7 | 9 | 5 | 20 | — |
|  | amorphous resin | 30 | 10 | 50 | — | 30 |
| Evaluation Result | property (sheet-state) ($g/m^3 \cdot day$) | 0.34 | 0.38 | 0.35 | 0.35 | 0.39 |
|  | moldability | A | B | A | C | C |
|  | property (after molding) ($g/m^3 \cdot day$) | 0.59 | 0.67 | 0.63 | 1.02 | 0.87 |
|  | Moldable temperature range (heating plate temperature) | 118 to 126 | 118 to 124 | 120 to 128 | 120 to 122 | 120 to 124 |
|  | Transparency (internal haze) (%) | 40.8 | 55.8 | 29.1 | 57.8 | 41.2 |

INDUSTRIAL APPLICABILITY

A packing sheet of the present invention does not include halogen materials such as chlorine and fluorine, has high water vapor barrier property, and, for example, can be used for a PTP packing body. Therefore, the present invention is extremely useful industrially.

REFERENCE SIGNS LIST

1 packing sheet
2 cover substance
3 bottom substance
4 medication
21 packing body
22 second encapsulated form (perspective view)
23 second encapsulated form (perspective view)
24 second encapsulated form (sectional view)
100 center part of PTP packing body sample
100 to 109 thicknesses measurement parts

The invention claimed is:

1. A packing sheet comprising a blend resin which comprises:
   a high-density polyethylene resin (A);
   a petroleum resin (B); and
   an amorphous polyolefin resin (C), wherein a weight blending ratio ((A+B)/C) of the total weight of the high-density polyethylene (A) and the petroleum resin (B) to the weight of the amorphous polyolefin (C) is 50/50 or more and 90/10 or less;
   a weight blending ratio (N B) of the high-density polyethylene resin (A) to the petroleum resin (B) is 70/30 or more and 90/10 or less;
   a weight blend ratio (NC) of the high-density polyethylene resin (A) to the amorphous polyolefin (C) is 41/59 or more and 89/11 or less, and
   the packing sheet is a single-layer sheet.

2. The packing sheet according to claim 1, wherein the amorphous polyolefin resin (C) comprises a cyclic polyolefin.

3. The packing sheet according to claim 2, wherein the cyclic polyolefin comprises a copolymer of cyclic olefin and olefin.

4. The packing sheet according to claim 3, wherein
   the copolymer comprises a copolymer of one or more cyclic olefins selected from the group consisting of norbornene, a norbornene derivative, a product of the addition reaction of dicyclopentadiene and ethylene, and a product of the addition reaction of a dicyclopentadiene derivative and ethylene, and olefin.

5. The packing sheet according to claim 3, wherein
   the olefin comprises one or more olefins selected from the group consisting of ethylene, propylene, and butadiene.

6. The packing sheet according to claim 2, wherein the amorphous polyolefin resin (C) comprises a copolymer of norbornene and ethylene.

7. The packing sheet according to claim 1, wherein
   the amorphous polyolefin resin (C) is a copolymer of a product of the addition reaction of cyclopentadiene or a derivative thereof and norbornene or a derivative thereof and one or more unsaturated monomers selected from the group consisting of an ethylene, butadiene and styrene derivative, or a hydrogenated product thereof.

8. The packing sheet according to claim 1, wherein
   the amorphous polyolefin resin (C) is a copolymer of a product of the addition reaction of dicyclopentadiene or a derivative thereof and ethylene and one or more unsaturated monomers selected from the group consisting of an ethylene, butadiene, and styrene derivative, or a hydrogenated product thereof.

9. The packing sheet according to claim 1, wherein
   the petroleum resin (B) according to claim 1 is a hydrogenated dicyclopentadiene petroleum resin.

10. The packing sheet according to claim 1, wherein
    a number average molecular weight of the petroleum resin (B) is 300 to 2000.

11. The packing sheet according to claim 4, wherein the olefin includes one or more olefins selected from the group consisting of ethylene, propylene, and butadiene.

12. A press-through pack packing body, which is produced using the packing sheet of claim 1.

* * * * *